United States Patent
Moretti et al.

(10) Patent No.: US 7,631,906 B2
(45) Date of Patent: Dec. 15, 2009

(54) REMOVABLE PLUG-IN CONNECTION FOR HIGH-PRESSURE LINES

(75) Inventors: Erminio Moretti, Grenoble (FR); Daniel Martin-Cocher, Grenoble (FR); Albert Raymond, Claix (FR)

(73) Assignee: A. Raymond & Cie, Grenoble (FR)

( * ) Notice: Subject to any disclaimer, the term of this patent is extended or adjusted under 35 U.S.C. 154(b) by 610 days.

(21) Appl. No.: 10/543,667

(22) PCT Filed: Jan. 27, 2004

(86) PCT No.: PCT/EP2004/000723

§ 371 (c)(1), (2), (4) Date: Apr. 3, 2006

(87) PCT Pub. No.: WO2004/068020

PCT Pub. Date: Aug. 12, 2004

(65) Prior Publication Data

US 2006/0192381 A1   Aug. 31, 2006

(30) Foreign Application Priority Data

Jan. 31, 2003  (DE) ................. 103 04 074

(51) Int. Cl.
*F16L 21/06* (2006.01)
*F16L 37/00* (2006.01)

(52) U.S. Cl. .................. 285/322; 285/319; 285/321
(58) Field of Classification Search ............... 285/307, 285/319, 322, 321, 323
See application file for complete search history.

(56) References Cited

U.S. PATENT DOCUMENTS 3,132,667 A * 5/1964 Baker et al. ............. 137/630.15
3,885,851 A * 5/1975 Bennett ....................... 439/352

(Continued)

FOREIGN PATENT DOCUMENTS

DE        3724948 A1    2/1989

(Continued)

*Primary Examiner*—James M Hewitt
(74) *Attorney, Agent, or Firm*—Tarlli, Sundheim, Covell & Tummino, LLP

(57) ABSTRACT

A removable plug-in connection for high-pressure lines, in particular brake lines in the construction of motor vehicles. The connection includes a cylindrical receiving housing (1) with a central receiving chamber (2), in addition to a tubular plug-in part, which is equipped with a peripheral retaining rib. An insertion side of the receiving housing (1) has an enlarged receiving chamber (2) in which several radially guided locking elements (5) can be retained, the elements being clamped in a direction of the interior by a retaining ring (14). The locking elements (5) include two half-shells (8) that include retainer wedges (18) that point inwards, engaging behind the retaining rib (4) in a positive fit once the plug-in part (3) has been inserted. Each half-shell (8) has a projecting centering pin on one end face, the pin constituting an extension of the internal wall and engaging in a corresponding cavity on the opposing end face when the two half-shells (8) are assembled. Once the half-shells have been retained (8), the front edge (16) of the wall (15) that surrounds the enlarged receiving chamber (2') is bent inwards at an oblique angle to the axis of the receiving housing (1) until the retaining rib can pass through unhindered and the half-shells (8) are outwardly displaced when the plug-in part is inserted.

6 Claims, 2 Drawing Sheets

U.S. PATENT DOCUMENTS

| | | | |
|---|---|---|---|
| 4,376,525 A * | 3/1983 | Fremy | 251/149.6 |
| 5,078,433 A * | 1/1992 | Morse et al. | 285/281 |
| 5,425,558 A | 6/1995 | Dennany, Jr. | |
| 5,860,677 A * | 1/1999 | Martins et al. | 285/26 |
| 5,887,911 A | 3/1999 | Kargula | |
| 5,992,895 A * | 11/1999 | Steinkamp | 285/45 |
| 6,142,537 A | 11/2000 | Shimada et al. | |
| 7,270,349 B2 * | 9/2007 | Bamberger et al. | 285/322 |
| 7,344,166 B2 * | 3/2008 | Ketcham et al. | 285/319 |
| 2002/0158465 A1 * | 10/2002 | Tsurumi | 285/93 |
| 2005/0173923 A1 * | 8/2005 | Ketcham et al. | 285/319 |
| 2007/0228731 A1 * | 10/2007 | Elflein et al. | 285/347 |

FOREIGN PATENT DOCUMENTS

| | | |
|---|---|---|
| EP | 0618394 A2 | 10/1994 |
| EP | 0905430 A2 | 3/1999 |

* cited by examiner

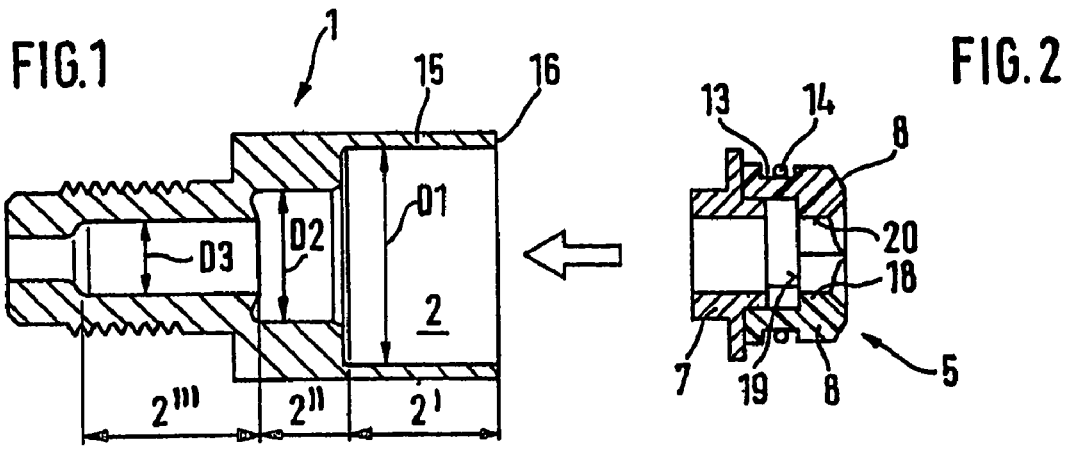
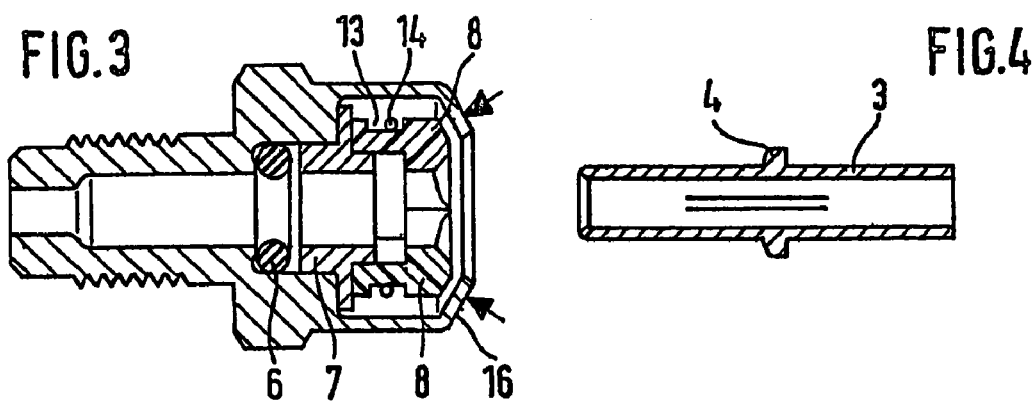
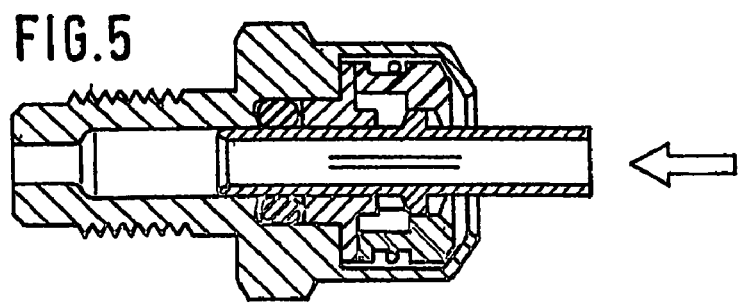
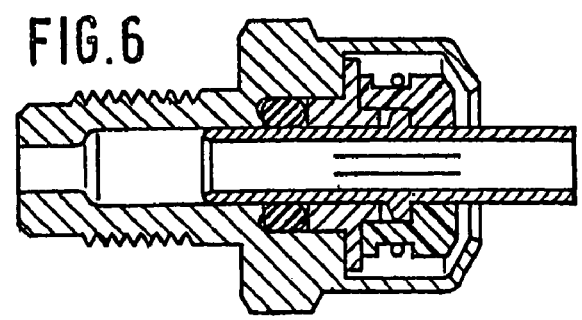

REMOVABLE PLUG-IN CONNECTION FOR HIGH-PRESSURE LINES

TECHNICAL FIELD

The present invention relates generally to removable plug-in connections and in particular to a removable plug-in connections for high-pressure lines such as brake lines used in motor vehicles.

BACKGROUND OF THE INVENTION

Removable plug-in connections are used in various applications. An example of this type of connection is described in German Patent DE 3734948 A1.

Plug-in connections of this type are intended for high-pressure lines, in particular, for brake lines in the construction of motor vehicles. They are usually comprised of a cylindrical receiving housing with a central receiving chamber for the insertion of a tubular plug-in part that is provided with a peripheral retaining rib, as well as with an enlarged receiving chamber on the insertion side for the embedding of locking elements with inwardly pointing retainer wedges, which are clamped in the direction of the interior by an encompassing, separate retaining ring made of stainless steel. When the plug-in part is inserted, the retainer wedges are pressed apart against the elastic force by its retaining rib and are brought together again after the plug-in part has penetrated completely, so that the retaining surfaces pointing in the direction of the interior engage in a positive fit behind the retaining rib on its back side.

In the case of the known plug-in connection, three retainer wedges held together by an elastic band are embedded in the enlarged receiving chamber of a separate collar sleeve, which is connected with the receiving housing after the retainer wedges are embedded. To produce the connection, the collar sleeve can either be provided on the end of its sleeve with an internal thread that is screwed onto an external thread located on the housing. Or else the sleeve is provided at its back end with a formed-on inner ring which locks into a corresponding groove upon assembly with the housing. Because of the two-part design of the receiving housing, assembly is very cumbersome and thus relatively expensive for a mass-produced article. Moreover, manual skill is also required in order to hold the three retainer wedges together in order to wind the elastic band around them and to embed this loose connection into the enlarged receiving chamber in the collar sleeve.

SUMMARY OF THE INVENTION

The object of the invention is to configure the previously mentioned plug-in connection in such a way that the production of the receiving housing is simplified and the assembly of the retainer wedges is thereby made easier.

According to the present invention, this is achieved in that the locking elements are formed by two half-shells that are held together by the retaining pin, whereby each half-shell has a projecting centering pin on one end face, said pin constituting an extension of the internal wall and engaging in a corresponding cavity in the opposing end face when the two half-shells are assembled, and that once the half-shells have been embedded, the front edge of the wall that surrounds the enlarged receiving chamber is bent inwards at an oblique angle to the housing axis such that the retaining rib can pass through unhindered and the half-shells can be displaced outwards when the plug-in part is inserted.

What is achieved through these constructional features is that because of the centering pins, the two half-shells can be easily assembled by their end faces and can be held together by placing the retaining ring around them in order to be able to insert them as a unit into the enlarged receiving chamber of the one-part housing. All that has to be done after that is to press together the front edge of the housing wall at an oblique angle by means of a suitable compressing device so that the half-shells in the enlarged receiving chamber are supported against the insertion device so that once the plug-in part is inserted into the housing and the retainer wedges close behind the retaining rib, it can no longer be removed from the coupling housing without first opening the half-shells.

The half-shells are expediently produced as two identical parts in hermaphroditic form, and are beveled at the front outside edges with a conical support surface at the same angle as the front edge of the housing wall, as a result of which a complete support of the half-shells on the inwardly flanged front edge is achieved. When flanging the front edge, it is advantageous if the housing is made of an injection molded metal that can be easily deformed plastically.

BRIEF DESCRIPTION OF THE DRAWINGS

A preferred embodiment of the invention is shown in the drawings and will be explained in more detail below. The following are shown:

FIG. 1 A longitudinal cross section of the receiving housing of the plug-in connection, FIG. 2 The assembled half-shells with guide ring prior to the installation of the enlarged receiving chamber, FIG. 3 The receiving housing with embedded half-shells following the flanging of the front edge, FIG. 4 The plug-in part prior to insertion into the coupling housing, FIG. 5 The plug-in part during insertion into the coupling housing, FIG. 6 The plug-in part following complete insertion into the coupling housing, FIG. 7 A side view of the upper and lower half-shells, FIG. 8 A front view of the upper and lower half-shells, FIG. 9 A top view of the lower half-shell and FIG. 10 A side view of the two assembled half-shells, with a partial cross section through the centering pins.

DETAILED DESCRIPTION

Figure 7:
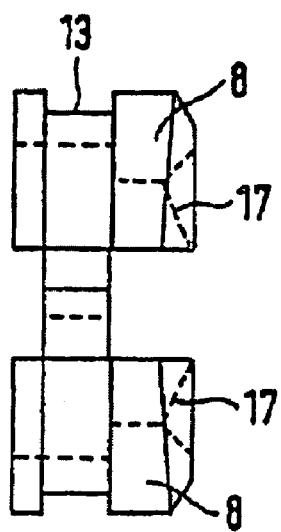

The plug-in connection shown in the Figures is comprised of a cylindrical receiving housing 1 with a central receiving chamber 2 that is stepped in several stages (see FIG. 1) and a tubular plug-in part 3 with a peripheral retaining rib 4 that is formed on just before its end (see FIG. 4). In the present embodiment, the plug-in part 3 is the end of a robust metal tube that is used for brake lines, for example.

The housing 1 possesses at its front, insertion-side region an enlarged receiving chamber 2' with an inside diameter D1 for embedding radially guided locking elements 5 and adjacent to that, a second stepped receiving chamber 2" with a diameter D2 for holding a sealing ring 6 and a guide sleeve 7 for the plug-in part 3. That is followed by a further stepped receiving chamber 2''' with a diameter D3, which serves for the direct receiving of the plug-in part 3.

Figure 8:
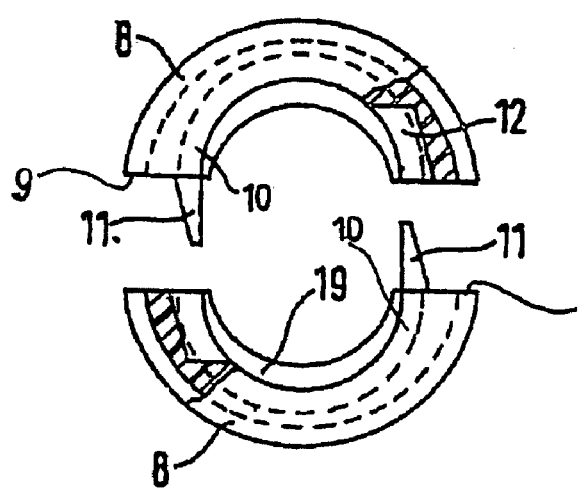
Figure 9:
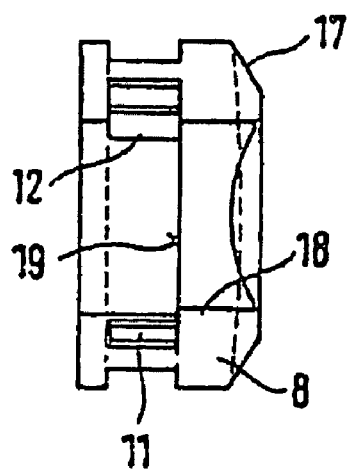
Figure 10:
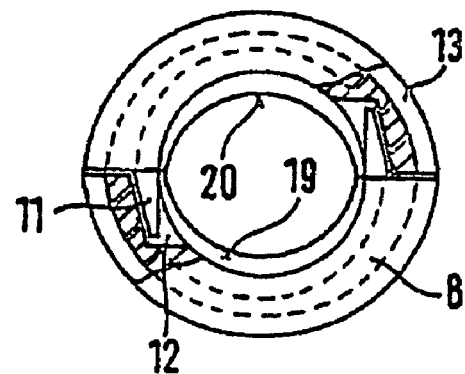

The inventive design of the locking elements 5 can be seen in FIGS. 7 through 10. These locking elements 5 are comprised of two hermaphroditically designed half-shells 8 which are formed from plastic and which are assembled into a ring through mutual contacting of the end faces 9. To simplify assembly, each half-shell 8 has at its one end face 9 a centering pin 11 that projects in the form of an extension of the internal wall 10, and at their other end face 9, a corresponding cavity 12, whereby each centering pin 11 engages in the opposite cavity 12 when the half-shells 8 are assembled.

The half-shells 8 possess on their external wall a peripheral groove 13, which serves to receive a retaining ring 14 that surrounds the half-shells 8 and is preferably bent in a spiral shape and is bent from an elastic spring steel. Following the insertion of this retaining ring 14, the half-shells 8 are clamped to each other and can easily be inserted into the front receiving chamber together with the guide sleeve 7 as a single unit (see FIG. 2), the sealing ring 6 has to be inserted first.

In the insertion region, the receiving housing 1 is surrounded by an easily deformable plastic wall 15, which, once the guide sleeve 7 and the half-shells 8 have been embedded, is bent inwards at its front edge 16 at an oblique angle to the axis of the housing, and specifically, until the half-shells 8 are held opposite to the insertion direction, but can be displaced outwards freely when the plug-in part 3 is inserted (see FIG. 3).

The half-shells 8 possess on their inside retainer wedges 18 with retaining surfaces 19 which point in the insertion direction and which engage behind the retaining rib 4 in a positive fit once the plug-in part 3 has been inserted. The half-shells 8 additionally possess on their outer edges on the insertion side conical support surfaces 17, which are at the same angle to the axis of the housing as the front edge 16 of the external wall 15.

The movement of the half-shells 8 during insertion of the plug-in part 3 into the receiving chamber 2''' is shown clearly in FIGS. 5 and 6. First, the half-shells 8 are pressed apart against the elastic force of the retaining ring 14 when the retaining rib 4 strikes the retainer wedges 18. As soon as the retaining rib 4 has passed the inside edges 20 of the retainer wedges 18, the half-shells 8 move back into their starting position, thereby engaging with the retaining surfaces 19 behind the retaining rib 4 so that the coupling is firmly closed. The inwardly flanged front edge 16 and the conical support surfaces 17 ensure that the half-shells 8 are securely held in the coupling housing 1 even in the event of high tensile forces which act on the plug-in part 3 when brake fluid flows through the coupling housing 1.

The invention claimed is:

1. A removable plug-in connection for high-pressure lines comprising
    a cylindrical receiving housing (1) with
        a central receiving chamber (2) for insertion of a tubular plug-in part (3), which is equipped with a peripheral retaining rib (4), and
        an enlarged receiving chamber (2') on the insertion side in which several radially guided locking elements (5) can be retained, said elements being clamped in a direction of the interior by a retaining ring (14), whereby the locking elements (5) have inwardly pointing retainer wedges (18) with retaining surfaces (19) which engage behind the retaining rib (4) in a positive fit once the plug-in part (3) has been inserted,
    the locking elements (5) include two half-shells (8) that are held together by the retaining ring (14), whereby each half-shell (8) has a projecting centering pin (11) on one end face (9), said pin forming an extension of an internal wall (10) and engaging in a corresponding cavity (12) on the opposing end face when the two half-shells (8) are assembled,
    wherein once the half-shells (8) have been installed, the front edge (16) of the wall (15) on the insertion side of the housing (1) that surrounds the enlarged receiving chamber (2') is bent inwards at an oblique angle to the axis of the receiving housing (1) such that the retaining rib (4) can pass through unhindered and the half-shells (8) are outwardly displaced when the plug-in part (3) is inserted.

2. A removable plug-in connection according to claim 1, characterized in that the two half-shells (8) have the same hermaphroditic form.

3. A removable plug-in connection according to claim 1, characterized in that at the front outer edges, the half-shells (8) are beveled with a conical support surface (17) at the same angle as the front edge (16) of the external wall (15).

4. A removable plug-in connection according to claim 3, characterized in that the housing (1) is made of an injection molded metal that can be deformed plastically.

5. A removable plug-in connection according to claim 2, characterized in that at the front outer edges, the half-shells (8) are beveled with a conical support surface (17) at the same angle as the front edge (16) of the external wall (15).

6. A removable plug-in connection according to claim 5, characterized in that the housing (1) is made of an injection molded metal that can be deformed plastically.

\* \* \* \* \*